US012613647B2

(12) United States Patent  
Liu et al.

(10) Patent No.: US 12,613,647 B2  
(45) Date of Patent: Apr. 28, 2026

(54) I/O REQUEST PROCESSING METHOD, APPARATUS, AND SYSTEM, DEVICE, AND STORAGE MEDIUM

(71) Applicant: Huawei Technologies Co., Ltd., Shenzhen (CN)

(72) Inventors: Shuo Liu, Shenzhen (CN); Junyi Zhang, Waterloo (CA); Qiaoling Wang, Shenzhen (CN); Peng Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 18/590,268

(22) Filed: Feb. 28, 2024

(65) Prior Publication Data

US 2024/0201881 A1 Jun. 20, 2024

Related U.S. Application Data

(63) Continuation of application No. PCT/CN2022/115524, filed on Aug. 29, 2022.

(30) Foreign Application Priority Data

Aug. 31, 2021 (CN) .......................... 202111013237.X

(51) Int. Cl.  
G06F 15/16 (2006.01)  
G06F 3/06 (2006.01)

(52) U.S. Cl.  
CPC .......... G06F 3/0635 (2013.01); G06F 3/0604 (2013.01); G06F 3/067 (2013.01)

(58) Field of Classification Search  
CPC ....... G06F 3/0635; G06F 3/0604; G06F 3/067  
See application file for complete search history.

(56) References Cited

U.S. PATENT DOCUMENTS

| | | | |
|---|---|---|---|
| 11,048,644 B1 * | 6/2021 | Volpe | .................. G06F 12/1072 |
| 11,474,719 B1 * | 10/2022 | Sular | ..................... G06F 3/0619 |
| 2015/0039792 A1 | 2/2015 | Spry | |
| 2020/0250080 A1 * | 8/2020 | Yao | ......................... G06F 3/067 |

FOREIGN PATENT DOCUMENTS

CN 113315845 A 8/2021

OTHER PUBLICATIONS

China Academy of Telecommunication Research of MIIT (CAICT), In-memory database white paper, CCSA TC60, Jun. 2019, total 99 pages.  
NVM Express Revision 1.4b, NVM Express Base Specification, Sep. 21, 2020, total 406 pages.

* cited by examiner

*Primary Examiner* — Joseph R Maniwang  
(74) *Attorney, Agent, or Firm* — Conley Rose, P.C.

(57) ABSTRACT

An input/output (I/O) request processing method includes: receiving a target I/O request, where the target I/O request carries a destination address and a target logical block address, and the destination address is a node address of a first storage node; determining, based on a preset correspondence between a logical block address and a storage node, a second storage node corresponding to the target logical block address; if the second storage node is inconsistent with the first storage node, modifying the destination address in the target I/O request to a node address of the second storage node, to obtain a target I/O request having a modified destination address; and sending the target I/O request having the modified destination address.

20 Claims, 5 Drawing Sheets

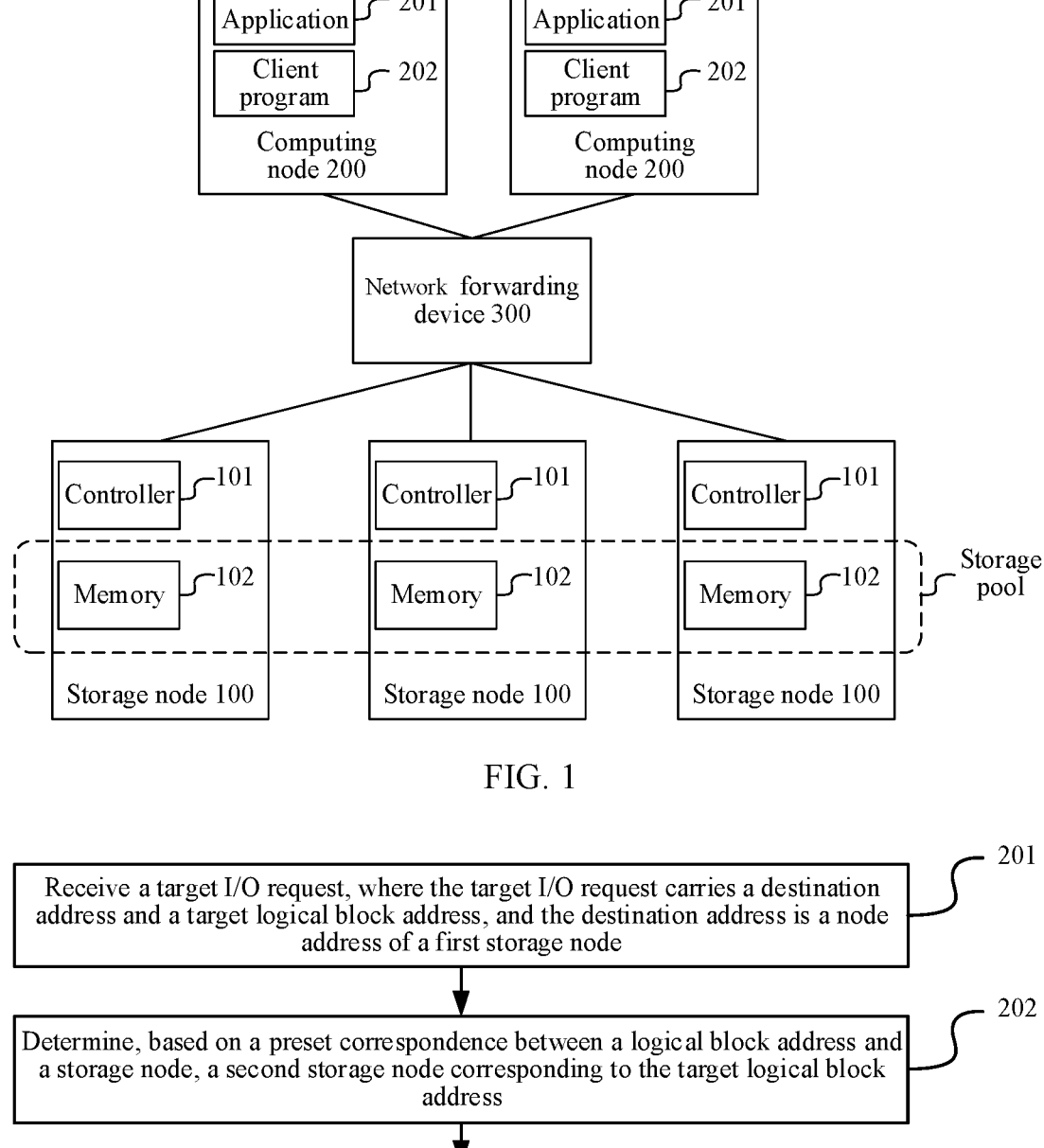

FIG. 1

Receive a target I/O request, where the target I/O request carries a destination address and a target logical block address, and the destination address is a node address of a first storage node ⟵ 201

Determine, based on a preset correspondence between a logical block address and a storage node, a second storage node corresponding to the target logical block address ⟵ 202

If the second storage node is inconsistent with the first storage node, modify the destination address in the target I/O request to a node address of the second storage node, to obtain a target I/O request having a modified destination address ⟵ 203

Send the target I/O request having the modified destination address ⟵ 204

FIG. 2

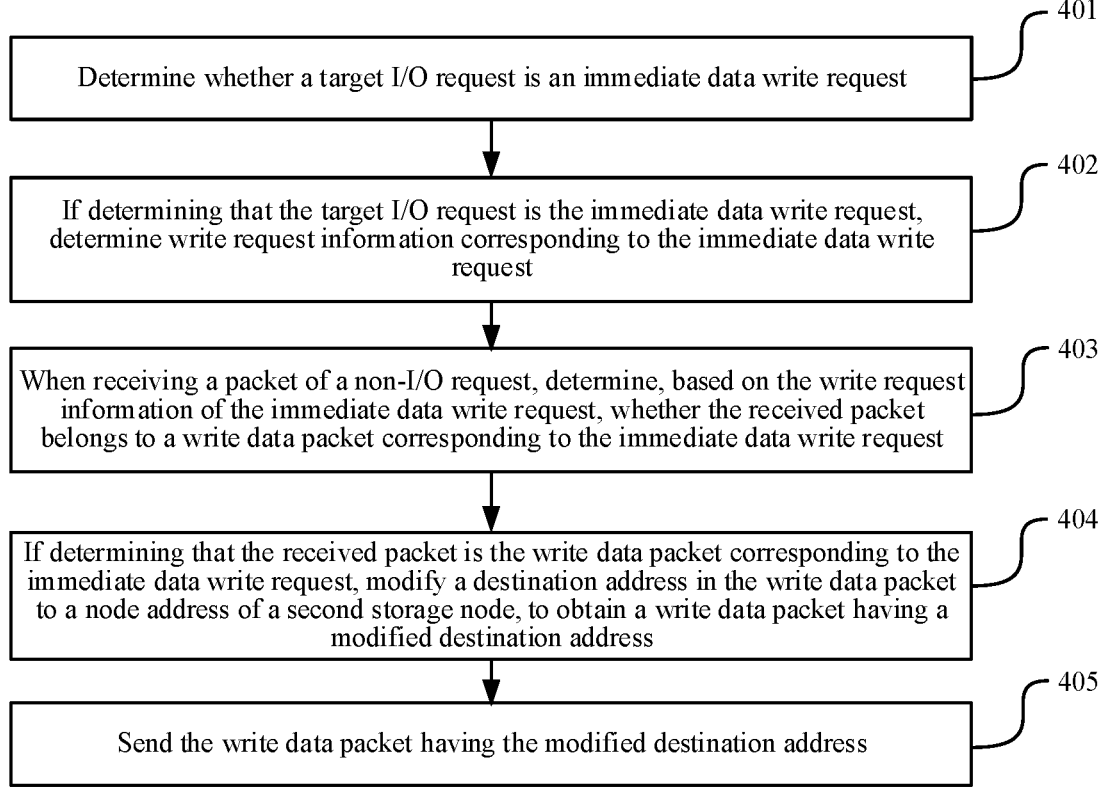

Determine whether a target I/O request is an immediate data write request    401

If determining that the target I/O request is the immediate data write request, determine write request information corresponding to the immediate data write request    402

When receiving a packet of a non-I/O request, determine, based on the write request information of the immediate data write request, whether the received packet belongs to a write data packet corresponding to the immediate data write request    403

If determining that the received packet is the write data packet corresponding to the immediate data write request, modify a destination address in the write data packet to a node address of a second storage node, to obtain a write data packet having a modified destination address    404

Send the write data packet having the modified destination address    405

FIG. 4

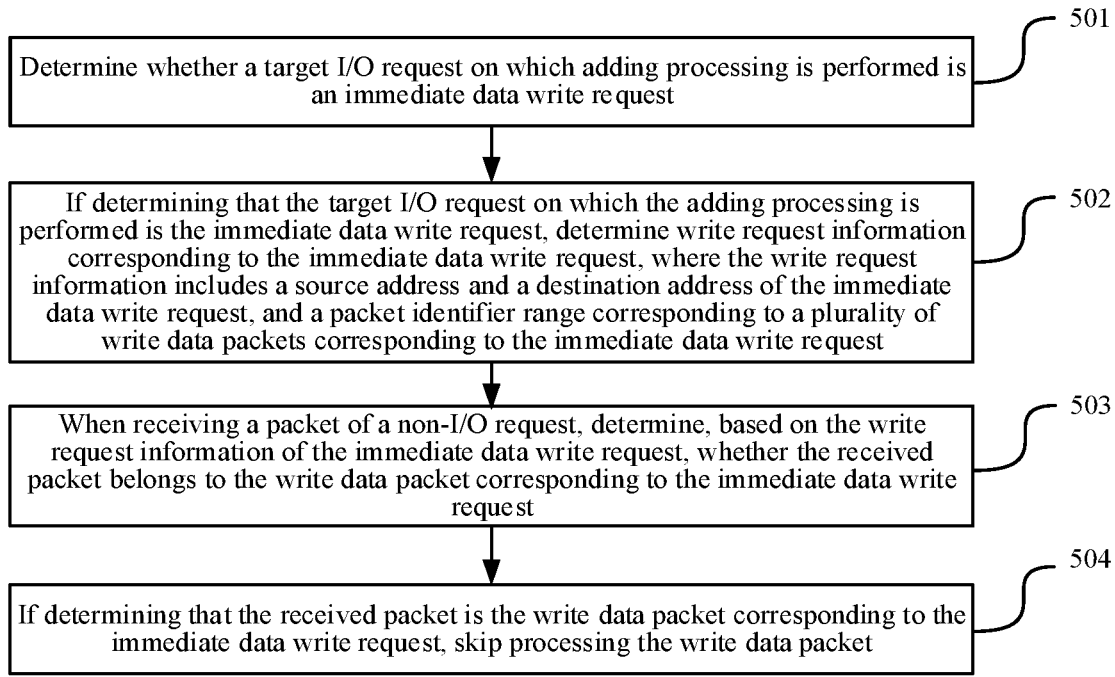

Determine whether a target I/O request on which adding processing is performed is an immediate data write request ⟋ 501

If determining that the target I/O request on which the adding processing is performed is the immediate data write request, determine write request information corresponding to the immediate data write request, where the write request information includes a source address and a destination address of the immediate data write request, and a packet identifier range corresponding to a plurality of write data packets corresponding to the immediate data write request ⟋ 502

When receiving a packet of a non-I/O request, determine, based on the write request information of the immediate data write request, whether the received packet belongs to the write data packet corresponding to the immediate data write request ⟋ 503

If determining that the received packet is the write data packet corresponding to the immediate data write request, skip processing the write data packet ⟋ 504

FIG. 5

Receiving module ⟋ 610

Determining module ⟋ 620

Modification module ⟋ 630

Sending module ⟋ 640

FIG. 6

I/O REQUEST PROCESSING METHOD, APPARATUS, AND SYSTEM, DEVICE, AND STORAGE MEDIUM

CROSS-REFERENCE TO RELATED APPLICATIONS

This is a continuation of International Patent Application No. PCT/CN2022/115524 filed on Aug. 29, 2022, which claims priority to Chinese Patent Application No. 202111013237.X, filed on Aug. 31, 2021. The disclosures of the aforementioned applications are hereby incorporated by reference in their entireties.

TECHNICAL FIELD

The present disclosure relates to the field of computer technologies, and in particular, to an input/output (I/O) request processing method, apparatus, and system, a device, and a storage medium.

BACKGROUND

With the development of internet technologies and big data, some internet enterprises, financial enterprises, and the like may purchase a storage system developed by a hardware vendor, to store various service data generated during operation of the enterprises.

The storage system developed by the hardware vendor may include a plurality of storage nodes. Each storage node may include a controller and a memory. The memories of the plurality of storage nodes may construct a storage pool, to provide a data storage function. A skilled person may divide storage space in the storage pool into a plurality of logical blocks, to avoid a conflict occurring when each storage node processes an I/O request and implement load balancing between the storage nodes. The skilled person may preset a data processing policy in the controller of each storage node, to enable each storage node to be responsible for only data reading and writing of a logical block corresponding to the storage node.

After purchasing the storage system developed by the hardware vendor, the internet enterprises, the financial enterprises, and the like may send an I/O request to each storage node of the storage system by using third-party multipathing software, to read and write the data in the storage system. However, the third-party multipathing software is decoupled from the data processing policy set by a skilled person of the hardware vendor. To be specific, the third-party multipathing software cannot determine which storage node processes one I/O request. Generally, the third-party multipathing software randomly sends the I/O request to each storage node of the storage system via a network forwarding device (such as a switch or a router), to implement load balancing. After receiving the I/O request forwarded by the network forwarding device, the controller of the storage node may determine, according to the preset data processing policy, a storage node that processes the I/O request. If determining that the I/O request is a request to be processed by another storage node, the controller may forward the I/O request to a corresponding storage node for processing. However, in this case, the I/O request needs to be forwarded between the storage nodes, reducing efficiency of processing the I/O request by the storage system.

SUMMARY

Embodiments of the present disclosure provide an I/O request processing method, apparatus, and system, a device, and a storage medium, to resolve a problem that efficiency of processing an I/O request by a storage system is reduced. The technical solutions are as follows.

According to a first aspect, an I/O request processing method is provided, applied to a network forwarding device. The method includes: receiving a target I/O request, where the target I/O request carries a destination address and a target logical block address, and the destination address is a node address of a first storage node; determining, based on a preset correspondence between a logical block address and a storage node, a second storage node corresponding to the target logical block address; if the second storage node is inconsistent with the first storage node, modifying the destination address in the target I/O request to a node address of the second storage node, to obtain a target I/O request having a modified destination address; and sending the target I/O request having the modified destination address.

In the solution in this embodiment of the present disclosure, after receiving the target I/O request, the network forwarding device may determine, based on the target logical block address carried in the target I/O request and the preset correspondence between the logical block address and the storage node, the second storage node for actually processing the target I/O request. If it is determined that the second storage node for actually processing the target I/O request is not the first storage node corresponding to the destination address in the target I/O request, the destination address in the target I/O request may be modified to the node address of the second storage node, and then, the target I/O request having the modified destination address is sent. In this way, by using the network forwarding device, the target I/O request may be directly sent to the storage node for actually processing the target I/O request, without a need of forwarding the target I/O request between storage nodes of a storage system. This can improve efficiency of processing the target I/O request.

In a possible implementation, the destination address in the target I/O request is modified to a storage node address corresponding to the second storage node, and the node address of the first storage node is added to the target I/O request, to obtain the target I/O request having the modified destination address, where the target I/O request having the modified destination address indicates the second storage node to: perform, based on the target I/O request having the modified destination address, I/O request processing after the second storage node receives the target I/O request having the modified destination address; and after the second storage node completes the I/O request processing, send a first I/O request processing completion notification to the first storage node based on the node address of the first storage node.

In the solution in this embodiment of the present disclosure, when the destination address in the target I/O request is modified, the node address of the first storage node, that is, the destination address that has not been modified, may be further added to the target I/O request. In this way, after completing target I/O request processing, the second storage node may send, based on the node address of the first storage node that is added to the target I/O request, the first I/O request processing completion notification to the first storage node, and then the first storage node sends a second I/O request processing completion notification to a client device that sends the I/O request. In this way, the client device perceives that the target I/O request is sent to the first storage node, and then receives the I/O request processing completion notification returned by the first storage node. It can be learned that in this embodiment of the present disclosure, efficiency of processing the I/O by the storage system can be improved while the client device does not need to perform improvement. This can increase an application scope of the solution in this embodiment of the present disclosure.

In a possible implementation, a processed identifier is added to the target I/O request, to obtain a target I/O request on which adding processing is performed. The target I/O request on which the adding processing is performed is sent to the first storage node, where the processed identifier indicates the first storage node to: skip performing the I/O request processing on the target I/O request on which the adding processing is performed; and send the second I/O request processing completion notification to the network forwarding device after the first storage node receives the first I/O request processing completion notification sent by the second storage node. The second I/O request processing completion notification sent by the first storage node is received. The second I/O request processing completion notification is forwarded to a client device that delivers the target I/O request.

In the solution in this embodiment of the present disclosure, the network forwarding device may still send the target I/O request to the first storage node, but may add the processed identifier to the target I/O request before sending the target I/O request. In this way, after receiving the target I/O request on which the adding processing is performed, the first storage node may determine, based on the carried processed identifier, that there is already another storage node (the second storage node) that processes the target I/O request, and thus there is no need to perform the I/O request processing on the target I/O request. This can meet a communication protocol requirement between devices, avoid that the I/O request is forwarded between storage nodes, and improve efficiency of processing the target I/O request by the storage system.

In a possible implementation, it is determined whether the target I/O request is an immediate data write request. If it is determined that the target I/O request is the immediate data write request, write request information corresponding to the immediate data write request is determined, where the write request information includes a source address and a destination address of the immediate data write request, and a sequence number range of at least one write data packet corresponding to the immediate data write request. When a packet of a non-I/O request is received, a source address, a destination address, and a sequence number of the packet of the non-I/O request are obtained. Whether the received packet belongs to the write data packet corresponding to the immediate data write request is determined based on the write request information of the immediate data write request. If it is determined that the received packet is the write data packet corresponding to the immediate data write request, a destination address in the write data packet is modified to the node address of the second storage node, to obtain a write data packet having a modified destination address. The write data packet having the modified destination address is sent.

In the solution in this embodiment of the present disclosure, the target I/O request may further include the immediate data write request. The immediate data write request is different from a read I/O request or a write I/O request. The immediate data write request may carry some data to be written into the storage system. Remaining data to be written into the storage system may be respectively carried in a plurality of consecutive write data packets existing after the immediate data write request. Therefore, in the solution in this embodiment of the present disclosure, when it is determined that the target I/O request is the immediate data write request, the write request information of the immediate data write request, to be specific, the source address, the destination address, and the sequence number range of at least one write data packet corresponding to the immediate data write request, may be obtained. In this way, it may be determined, based on the write request information of the immediate data write request, whether the subsequently received packet is the write data packet corresponding to the immediate data write request, to complete sending processing on the write data packet existing after the immediate data write request. It can be learned that the solution in this embodiment of the present disclosure is applicable to processing on different I/O requests, including the write I/O request, the read I/O request, and the immediate data write request. This can improve the efficiency of processing the I/O request by the storage system.

According to a second aspect, an I/O request processing method is provided, applied to a second storage node. The method includes: receiving a target I/O request that has a modified destination address and that is sent by a network forwarding device, where the target I/O request having the modified destination address carries a node address of a first storage node; performing I/O request processing based on the target I/O request having the modified destination address; and after completing the I/O request processing, sending a first I/O request processing completion notification to the first storage node based on the node address of the first storage node, where the first I/O request processing completion notification indicates the first storage node to send a second I/O request processing completion notification to the network forwarding device after the first storage node receives the first I/O request processing completion notification, to enable the network forwarding device to forward the second I/O request processing completion notification to a client device that delivers the target I/O request.

In the solution in this embodiment of the present disclosure, after completing the I/O request processing based on the received target I/O request that has the modified destination address and that is sent by the network forwarding device, the second storage node may send, based on the node address of the first storage node that is carried in the target I/O request having the modified destination address, the first I/O request processing completion notification to the first storage node, and then the first storage node sends the second I/O request processing completion notification to the client device that sends the I/O request. It can be learned that, by using the network forwarding device, the target I/O request may be directly sent to the storage node for actually processing the target I/O request, without a need of forwarding the target I/O request between storage nodes of a storage system. This can improve efficiency of processing the target I/O request. In addition, the client device perceives that the target I/O request is sent to the first storage node, and then receives the I/O request processing completion notification returned by the first storage node. It can be learned that in this embodiment of the present disclosure, efficiency of processing the I/O by the storage system can be improved while the client device does not need to perform improvement. This can increase an application scope of the solution in this embodiment of the present disclosure.

According to a third aspect, an I/O request processing method is provided, applied to a third storage node. The method includes: receiving a target I/O request on which adding processing is performed and that is sent by a network forwarding device, where a processed identifier is added to the target I/O request on which the adding processing is performed; receiving a first I/O request processing completion notification sent by a second storage node; and sending a second I/O request processing completion notification to the network forwarding device, to enable the network forwarding device to forward the second I/O request processing completion notification to a client device that delivers the target I/O request.

In the solution in this embodiment of the present disclosure, after receiving the target I/O request on which the adding processing is performed and that is sent by the network forwarding device, the first storage node may not perform I/O request processing on the target I/O request on which the adding processing is performed. When the first I/O request processing completion notification sent by the second storage node is received, the second I/O request processing completion notification is sent to the network forwarding device. It can be learned that, by using the network forwarding device, the target I/O request may be directly sent to the storage node for actually processing the target I/O request, without a need of forwarding the target I/O request between storage nodes of a storage system. This can improve efficiency of processing the target I/O request. In addition, the client device perceives that the target I/O request is sent to the first storage node, and then receives the I/O request processing completion notification returned by the first storage node. It can be learned that in this embodiment of the present disclosure, efficiency of processing the I/O by the storage system can be improved while the client device does not need to perform improvement. This can increase an application scope of the solution in this embodiment of the present disclosure.

In a possible implementation, it is determined whether the target I/O request on which the adding processing is performed is an immediate data write request. If it is determined that the target I/O request on which the adding processing is performed is the immediate data write request, write request information corresponding to the immediate data write request is determined, where the write request information includes a source address and a destination address of the immediate data write request, and a packet identifier range corresponding to a plurality of write data packets corresponding to the immediate data write request. When a packet of a non-I/O request is received, a source address, a destination address, and a sequence number of the packet of the non-I/O request are obtained. Whether the received packet belongs to the write data packet corresponding to the immediate data write request is determined based on the write request information of the immediate data write request. If it is determined that the received packet is the write data packet corresponding to the immediate data write request, the write data packet is not processed.

In the solution in this embodiment of the present disclosure, the target I/O request may further include the immediate data write request. The immediate data write request is different from a read I/O request or a write I/O request. The immediate data write request may carry some data to be written into the storage system. Remaining data to be written into the storage system may be respectively carried in a plurality of consecutive write data packets existing after the immediate data write request. Therefore, in the solution in this embodiment of the present disclosure, when it is determined that the target I/O request is the immediate data write request, the write request information of the immediate data write request, to be specific, the source address, the destination address, and the sequence number range of at least one write data packet corresponding to the immediate data write request, may be obtained. In this way, it may be determined, based on the write request information of the immediate data write request, whether the subsequently received packet is the write data packet corresponding to the immediate data write request, and if yes, the write data packet may not be processed. In this way, the client device perceives that the target I/O request is sent to the first storage node, and receives the I/O request processing completion notification returned by the first storage node.

According to a fourth aspect, an I/O request processing apparatus is provided, applied to a network forwarding device. The apparatus includes: a receiving module configured to receive a target I/O request, where the target I/O request carries a destination address and a target logical block address, and the destination address is a node address of the first storage node; a determining module configured to determine, based on a preset correspondence between a logical block address and a storage node, a second storage node corresponding to the target logical block address; a modification module configured to: if the second storage node is inconsistent with the first storage node, modify the destination address in the target I/O request to a node address of the second storage node, to obtain a target I/O request having a modified destination address; and a sending module configured to send the target I/O request having the modified destination address.

In a possible implementation, the modification module is configured to: modify the destination address in the target I/O request to a storage node address corresponding to the second storage node, and add the node address of the first storage node to the target I/O request, to obtain the target I/O request having the modified destination address, where the target I/O request having the modified destination address indicates the second storage node to: perform, based on the target I/O request having the modified destination address, I/O request processing after the second storage node receives the target I/O request having the modified destination address; and after the second storage node completes the I/O request processing, send a first I/O request processing completion notification to the first storage node based on the node address of the first storage node.

In a possible implementation, the sending module is further configured to: add a processed identifier to the target I/O request, to obtain a target I/O request on which adding processing is performed; and send the target I/O request on which the adding processing is performed to the first storage node, where the processed identifier indicates the first storage node to: skip performing the I/O request processing on the target I/O request on which the adding processing is performed; and send a second I/O request processing completion notification to the network forwarding device after the first storage node receives the first I/O request processing completion notification sent by the second storage node.

The receiving module is further configured to receive the second I/O request processing completion notification sent by the first storage node.

The sending module is further configured to send the second I/O request processing completion notification to a client device that delivers the target I/O request.

In a possible implementation, the determining module is further configured to: determine whether the target I/O request is an immediate data write request; and if determining that the target I/O request is the immediate data write request, determine write request information corresponding to the immediate data write request, where the write request information includes a source address and a destination address of the immediate data write request, and a sequence number range of at least one write data packet corresponding to the immediate data write request; when a packet of a non-I/O request is received, obtain a source address, a destination address, and a sequence number of the packet of the non-I/O request, and determine, based on the write request information of the immediate data write request, whether the received packet belongs to the write data packet corresponding to the immediate data write request; and if determining that the received packet is the write data packet corresponding to the immediate data write request, modify a destination address in the write data packet to the node address of the second storage node, to obtain a write data packet having a modified destination address.

The sending module is further configured to send the write data packet having the modified destination address.

According to a fifth aspect, an I/O request processing apparatus is provided, applied to a second storage node. The apparatus includes: a receiving module configured to receive a target I/O request that has a modified destination address and that is sent by a network forwarding device, where the target I/O request having the modified destination address carries a node address of a first storage node; a processing module configured to perform I/O request processing based on the target I/O request having the modified destination address; and a sending module configured to: after the I/O request processing is completed, send a first I/O request processing completion notification to the first storage node based on the node address of the first storage node, where the first I/O request processing completion notification indicates the first storage node to send a second I/O request processing completion notification to the network forwarding device after the first storage node receives the first I/O request processing completion notification, to enable the network forwarding device to forward the second I/O request processing completion notification to a client device that delivers the target I/O request.

According to a sixth aspect, an I/O request processing apparatus is provided, applied to a first storage node. The apparatus includes: a receiving module configured to: receive a target I/O request on which adding processing is performed and that is sent by a network forwarding device, where a processed identifier is added to the target I/O request on which the adding processing is performed; and receive a first I/O request processing completion notification sent by a second storage node; and a sending module configured to send a second I/O request processing completion notification to the network forwarding device, to enable the network forwarding device to forward the second I/O request processing completion notification to a client device that delivers the target I/O request.

In a possible implementation, the apparatus further includes a determining module configured to: determine whether the target I/O request on which the adding processing is performed is an immediate data write request; if determining that the target I/O request on which the adding processing is performed is the immediate data write request, determine write request information corresponding to the immediate data write request, where the write request information includes a source address and a destination address of the immediate data write request, and a packet identifier range corresponding to a plurality of write data packets corresponding to the immediate data write request; when a packet of a non-I/O request is received, obtain a source address, a destination address, and a sequence number of the packet of the non-I/O request, and determine, based on the write request information of the immediate data write request, whether the received packet belongs to the write data packet corresponding to the immediate data write request; and if determining that the received packet is the write data packet corresponding to the immediate data write request, skip processing the write data packet.

According to a seventh aspect, an I/O request processing system is provided. The system includes a network forwarding device, a first storage node, and a second storage node.

The network forwarding device is configured to: receive a target I/O request, where the target I/O request carries a destination address and a target logical block address, and the destination address is a node address of the first storage node; determine, based on a preset correspondence between a logical block address and a storage node, the second storage node corresponding to the target logical block address; if the second storage node is inconsistent with the first storage node, modify the destination address in the target I/O request to a node address of the second storage node, to obtain a target I/O request having a modified destination address; and send the target I/O request having the modified destination address.

The second storage node is configured to: receive the target I/O request that has the modified destination address and that is sent by the network forwarding device, where the target I/O request having the modified destination address carries the node address of the first storage node; perform I/O request processing based on the target I/O request having the modified destination address; and after completing the I/O request processing, send a first I/O request processing completion notification to the first storage node based on the node address of the first storage node.

The first storage node is configured to: receive a target I/O request on which adding processing is performed and that is sent by the network forwarding device, where a processed identifier is added to the target I/O request on which the adding processing is performed; receive the first I/O request processing completion notification sent by the second storage node; and send a second I/O request processing completion notification to the network forwarding device.

According to an eighth aspect, a network forwarding device is provided. The network forwarding device includes a memory and a processor. The memory is configured to store computer instructions, and the processor executes the computer instructions stored in the memory, to enable the network forwarding device to perform the method in the first aspect or any possible implementation of the first aspect.

According to a ninth aspect, a storage node is provided. The storage node includes a memory and a processor. The memory is configured to store computer instructions, and the processor executes the computer instructions stored in the memory, to enable the storage node to perform the method in the second aspect or any possible implementation of the second aspect, and perform the method in the third aspect or any possible implementation of the third aspect.

According to a tenth aspect, a computer-readable storage medium is provided. The computer-readable storage medium stores computer program code. When the computer program code is executed by a computer device, the computer device implements the method in the first aspect, the second aspect, the third aspect, any possible implementation of the first aspect, any possible implementation of the second aspect, or any possible implementation of the third aspect.

According to an eleventh aspect, the present disclosure provides a computer program product. The computer program product is included in a computer program stored in a computer-readable storage medium. In addition, the computer program is loaded by using a processor to implement the method in the first aspect, the second aspect, the third aspect, any possible implementation of the first aspect, any possible implementation of the second aspect, or any possible implementation of the third aspect.

BRIEF DESCRIPTION OF DRAWINGS

FIG. 1 is a schematic diagram of a system framework according to an embodiment of the present disclosure;

FIG. 2 is a flowchart of an I/O request processing method according to an embodiment of the present disclosure;

FIG. 4 is a flowchart of an I/O request processing method according to an embodiment of the present disclosure;

FIG. 5 is a flowchart of an I/O request processing method according to an embodiment of the present disclosure;

FIG. 6 is a schematic diagram of a structure of an I/O request processing apparatus according to an embodiment of the present disclosure;

DESCRIPTION OF EMBODIMENTS

Figure 3:
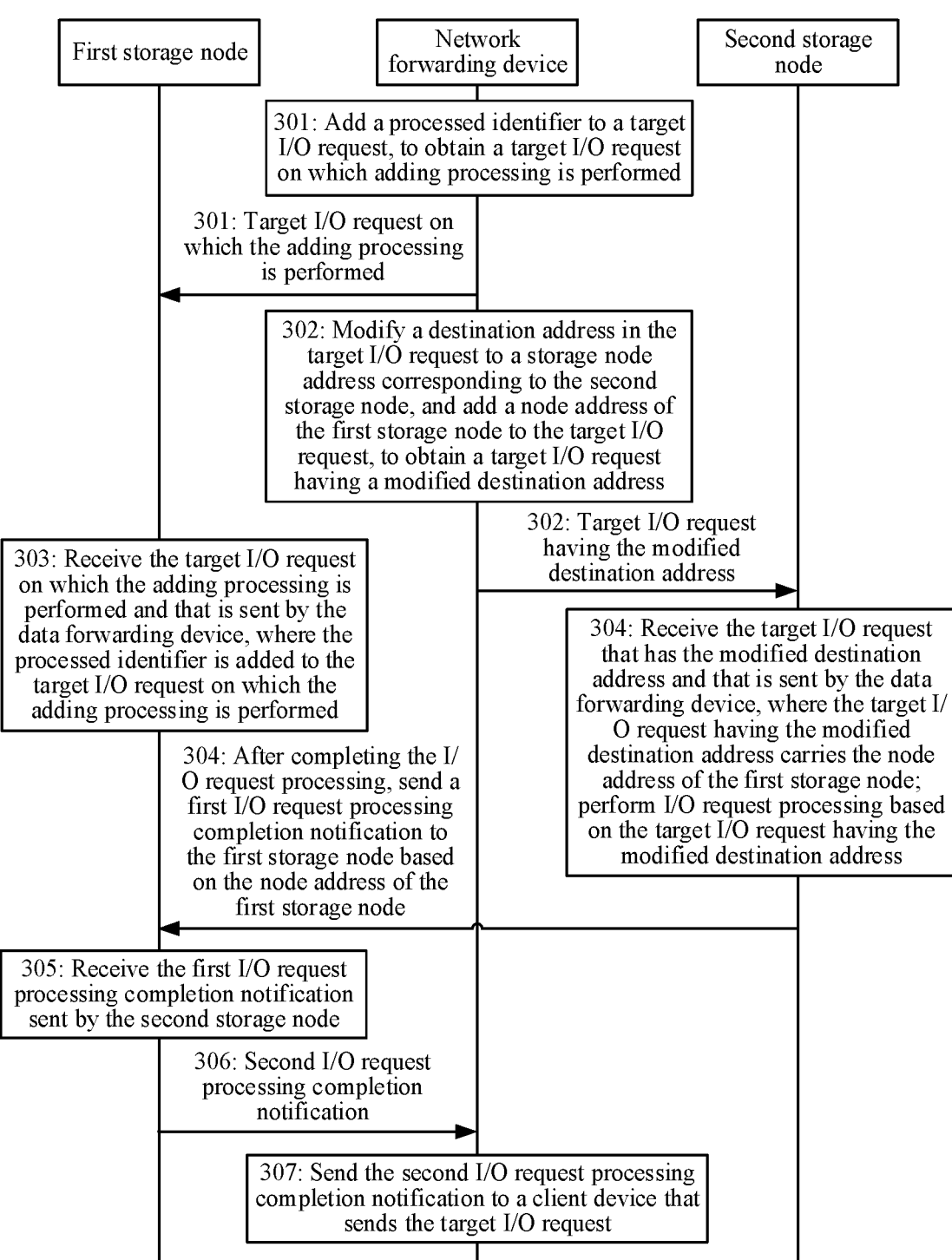
FIG. 3 is a flowchart of an I/O request processing method according to an embodiment of the present disclosure.

Embodiments of the present disclosure provide an I/O request processing method. The method may be applied to a storage system. The storage system may be a distributed storage system. As shown in FIG. 1, the storage system provided in embodiments includes a plurality of storage nodes 100 (where three storage nodes 100 are shown in FIG. 1, but it is not limited to three storage nodes 100), at least one computing node 200, and a network forwarding device 300.

The storage node 100 may be a server, a desktop computer, a controller of a storage array, a disk enclosure, or the like. The storage nodes 100 may be interconnected. In terms of functions, the storage node 100 is mainly configured to compute and store data, and the like. In terms of hardware, as shown in FIG. 1, the storage node 100 includes at least a controller 101 and a memory 102. The controller 101 may include a processor, for example, a central processing unit (CPU) configured to process data outside the storage node 100 or data generated inside the storage node 100. The memory 102 is an apparatus configured to store data, and may be, for example, a solid-state drive (SSD).

The computing node 200 may be a computing node on a user side, for example, a server or a desktop computer. At a hardware level, a processor and a memory are disposed in the computing node 200. At a software level, an application 201 and a client program 202 (a client for short) are run on the computing node 200. The application 201 is a general term for various applications presented to a user. The client 202 is configured to: receive a data processing request triggered by the application 201, interact with the storage node 100, and send the data processing request to the storage node 100. The client 202 is further configured to: receive data from the storage node, and forward the data to the application 201. It may be understood that, when the client 202 is software, a function of the client 202 is implemented by running a program in the memory by the processor included in the computing node 200. The client 202 may alternatively be implemented by a hardware component located inside the computing node 200.

The network forwarding device 300 may be a device that is responsible for forwarding a packet in a network, for example, may be a switch or a router. The network forwarding device 300 may include a processor, a receiver, and a transmitter (which are not shown in FIG. 1), and may be configured to process, receive, and send data information between the storage node 100 and the computing node 200 in the storage system.

The solid-state drives included in the storage nodes 100 of the storage system may construct a storage pool configured to store the data in a unified manner. A skilled person may virtualize storage space in the storage pool into logical units (LUs), and provide the logical unit for the computing node 200 to use. Each logical unit has a unique logical unit number (LUN). Because the computing node 200 can directly sense the logical unit number, a person skilled in the art usually directly uses the LUN to represent the logical unit. Each LUN has a LUN identifier (ID) that identifies the LUN. In this case, a memory pool provides the storage space for the LUN by using a page as a granularity. In other words, when the storage node 100 applies for space from the memory pool, the memory pool allocates the space to the storage node by using a page or an integer multiple of a page. A size of one page may be 4 kilobytes (KB), 8 KB, or the like. The size of the page is not limited in the present disclosure. A specific location of the data in one LUN may be determined based on a start address and a length of the data. The start address is generally referred to as a logical block address (LBA) by a person skilled in the art. It may be understood that the three factors, the LUN ID, the LBA, and the length, identify a determined address segment, and one address segment may be used to index to one global address.

In an existing solution, the client program 202 of the computing node 200 may be third-party multipathing software. When the computing node 200 needs to read or write the data in the storage pool, the computing node 200 may randomly send a corresponding I/O request to the storage node 100 by using the third-party multipathing software. The I/O request may carry address information of the corresponding storage node 100 and an LBA of to-be-read and written data in the storage pool. The computing node 200 may send the I/O request to the network forwarding device 300, and the network forwarding device 300 may forward the I/O request to the corresponding storage node 100. However, in the conventional technology, a data processing policy, namely, a policy for processing the I/O request, is set on the storage node 100. After receiving the I/O request sent by the network forwarding device 300, the storage node 100 may determine, according to the policy for processing the I/O request, a target storage node 100 for processing the I/O request, and then forward the I/O request to the target storage node 100. In this case, any I/O request may be forwarded between the storage nodes of the storage system, and when the I/O request is forwarded by the storage node, interruption of the CPU in the controller is triggered, causing low efficiency of processing the I/O request.

An I/O request processing method provided in the present disclosure may be applied to a storage system, to avoid that an I/O request is forwarded between storage nodes of the storage system. This can improve efficiency of processing the I/O request.

For ease of understanding of embodiments of the present disclosure, the following first describes some related concepts.

High-speed serial computer extended bus (Peripheral Component Interconnect express (PCIe)) standard: The biggest significance of the PCIe lies in versatility that may enable the PCIe to be used to connect a southbridge to another device, extended to connect chip sets, and even used to connect a graphics processing unit. In this way, an entire I/O system is reunified. This further simplifies a computer system and increases portability and modularization of a computer.

The Non-Volatile Memory Express (NVMe) is a logical device interface specification. The non-volatile memory express is a device logical interface-based bus transport protocol specification (equivalent to an application layer in a communication protocol) for accessing a non-volatile memory medium (for example, a SSD using a flash memory) attached through a PCIe bus.

The NVMe over Fabrics (NVMe-oF) is one sub-protocol of the NVMe, uses the NVMe as a main protocol, and specifies functions that a client reads and writes, and accesses a disk, and manages resource. The NVMe-oF is mainly an NVMe-based network protocol specification, and may combine a network protocol such as the remote direct memory access (RDMA) over converged Ethernet (ROCE) with the NVMe.

RDMA is a technology that bypasses an operating system kernel of a remote host to access data in a memory of the remote host. Because the operating system is bypassed, a large quantity of CPU resources are saved, and system throughput is improved and a network communication delay of the system is reduced as well. The specification is widely used in a large-scale parallel computer cluster in particular.

RoCE a technology that allows the RDMA over the Ethernet.

The following provides detailed descriptions of specific embodiments of the present disclosure.

An I/O request processing method provided in embodiments of the present disclosure may improve efficiency of processing an I/O request by a storage system. The method may be applied to a network forwarding device of a storage system. FIG. 2 is a flowchart of an I/O request processing method according to an embodiment of the present disclosure. The following provides detailed descriptions of a processing procedure of a network forwarding device with reference to specific implementations. Content may be as follows.

Step 201: Receive a target I/O request, where the target I/O request carries a destination address and a target logical block address, and the destination address is a node address of a first storage node.

The target I/O request may be an I/O request sent by any computing node to a storage node by using third-party multipathing software and the network forwarding device (which may be referred to as a switch subsequently). The I/O request sent by the computing node may carry a destination address of any storage node, that is, the node address of the first storage node, for example, an Internet Protocol (IP) address and a media access control (MAC) address of the first storage node. The I/O request may carry the target LBA. The target LBA is a start logical address at which the computing node requests to read or write data in a storage pool. In addition, it should be noted that, in the present disclosure, the third-party multipathing software may send the I/O request to any storage node of the storage system according to any delivery rule of the I/O request without a need of performing adaptive improvement.

When receiving any packet, the switch may determine whether the packet is a packet of the I/O request. For example, when remote data reading and writing are implemented between the computing node and the storage node based on an RDMA, a corresponding I/O request may be a packet (which may be referred to as a submission queue entry (SQE) packet subsequently) that carries SQE information of an NVMe protocol standard. After receiving the SQE packet, the switch may decapsulate the SQE packet, to obtain an SQE field. Whether the received packet is an I/O command may be determined based on "metadata" of a command recorded by first four bytes in the SQE field. If it is determined that the received packet belongs to the I/O request, an IP address, a MAC address, and the like of the packet may be obtained. The IP address and the MAC address are address information of the first storage node. The first storage node is a destination storage node to which the computing node originally needs to send the target I/O request.

Step 202: Determine, based on a preset correspondence between a logical block address and a storage node, a second storage node corresponding to the target logical block address.

In the correspondence between the logical block address and the storage node, a storage node corresponding to a logical block address is a storage node that performs data reading and writing on the logical block address. A skilled person may preset the correspondence between the logical block address and the storage node. As shown in Table 1, Table 1 includes a plurality of logical address segments, for example: LUN ID0, LBA0, Length; LUN ID1, LBA1, Length; LUN ID2, LBA2, Length; and storage nodes corresponding to the logical address segments. In Table 1, a stored node identifier, node address, or the like of the storage node may identify a corresponding storage node. In addition, Table 1 is a schematic example of the correspondence between the logical block address and the storage node, and may be specifically set by the skilled person based on an actual processing requirement. The correspondence may be a data processing policy mentioned above.

TABLE 1

| Correspondence between a logical address and a storage node | |
|---|---|
| Logical address segment | Storage node |
| LUN ID0, LBA0, Length | Storage node 0 |
| LUN ID1, LBA1, Length | Storage node 1 |
| LUN ID2, LBA2, Length | Storage node 2 |
| . . . | . . . |

After determining the target logical block address carried in the target I/O request, the switch may determine, from the correspondence, a storage node (the second storage node) corresponding to the target logical block address. The second storage node is a storage node that is of the storage system and that is for actually processing the target I/O request. For example, when it is determined that a target logical block carried in the target I/O request matches the logical address segment corresponding to LUN ID0, LBA0, Length, and the like, it may be determined, based on Table 1, that the storage node for processing the target I/O request is the storage node 0.

Step 203: If the second storage node is inconsistent with the first storage node, modify the destination address in the target I/O request to a node address of the second storage node, to obtain a target I/O request having a modified destination address.

After the second storage node corresponding to the target logical block address is determined based on the correspondence between the logical block address and the storage node, for example, after the node address or a node identifier corresponding to the second storage node is determined, it may be determined whether the second storage node is the first storage node to which the computing node expects to send the I/O request. For example, the node address corresponding to the first storage node and the node address corresponding to the second storage node may be compared.

If it is determined that the first storage node is consistent with the second storage node, that is, the first storage node and the second storage node are a same storage node, sending processing may be directly performed on the target I/O request, that is, the I/O request may be sent to the first storage node (or the second storage node). The first storage node (or the second storage node) processes the target I/O request.

If it is determined that the first storage node is inconsistent with the second storage node, it indicates that if the target I/O request is sent to the first storage node, the first storage node further needs to forward the target I/O request to the second storage node. Therefore, in this step, the destination address (that is, an address of the first storage node) in the target I/O request may be modified to an address of the second storage node. Specifically, the target I/O request may be first copied, to obtain a copied target I/O request, and then a target address may be modified based on the copied target I/O request, to obtain the target I/O request having the modified destination address. The original target I/O request may be sent to the first storage node. Processing performed by the first storage node on the original target I/O request is not described herein.

Step 204: Send the target I/O request having the modified destination address.

After modifying the destination address in the target I/O request, the switch may forward the target I/O request having the modified destination address, that is, send the target I/O request having the modified destination address to the second storage node. In this way, after receiving the target I/O request having the modified destination address, the second storage node may directly perform I/O request processing. It can be learned that the present disclosure may avoid that the I/O request is forwarded between the first storage node and the second storage node. This can improve efficiency of processing the I/O request.

In this embodiment of the present disclosure, it is determined, by using the network forwarding device, whether the storage node to which the target I/O request is to be forwarded is the storage node for processing the target I/O request. If the storage node to which the target I/O request is to be forwarded is not the storage node that processes the target I/O request, the destination address in the target I/O request may be modified, and further the target I/O request is directly sent to the storage node for actually processing the target I/O request, to avoid that the target I/O request is forwarded between storage nodes of the storage system. This can improve efficiency of processing the target I/O request.

In the present disclosure, processing of reading and writing the data by the computing node on the storage node may be implemented between the computing node and the storage node based on a protocol such as an NVMe-oF, the RDMA, and a RoCE. In the present disclosure, the I/O request includes a read I/O request, a write I/O request, and an immediate data write request. When the I/O request is the read I/O request and the write I/O request, for corresponding processing, refer to FIG. 3.

FIG. 3 is a flowchart of an I/O request processing method according to an embodiment of the present disclosure, applied to a network forwarding device and a storage node. Refer to FIG. 3. The method includes the following steps.

Step 301: The network forwarding device adds a processed identifier to a target I/O request to obtain a target I/O request on which adding processing is performed, and sends the target I/O request on which the adding processing is performed to a first storage node.

In this embodiment of the present disclosure, data reading and writing may be performed between a computing node and a storage node based on an RDMA protocol.

A switch may send the target I/O request to the first storage node, but may add the processed identifier to the target I/O request before sending the target I/O request to the first storage node. For example, in the present disclosure, a 4-bit reserved bit of a command double word 0 (CDW 0) in an NVMe protocol standard may be used to identify processing to be performed by a controller of the storage node. For example, in this step, the 4-bit reserved bit of CDW 0 may be set to 1111 as the processed identifier.

After the target I/O request on which the adding processing is performed is obtained, the target I/O request on which the adding processing is performed may be sent to the first storage node, to indicate the first storage node to: skip performing I/O request processing on the target I/O request on which the adding processing is performed; and send a second I/O request processing completion notification to the network forwarding device after receiving a first I/O request processing completion notification sent by the second storage node. In the NVMe protocol, the I/O request may be an SQE packet. After completing the I/O request processing, the storage node may return a complete queue entry (CQE) packet (which may be referred to as a CQE packet subsequently) to the computing node that sends the I/O request. The first I/O request processing completion notification may be any notification indicating that the second storage node completes the I/O request processing, the corresponding target I/O request is the SQE packet, and the second I/O request processing completion notification may be the CQE packet.

Step 302: The network forwarding device modifies a destination address in the target I/O request to a storage node address corresponding to the second storage node, adds the node address of the first storage node to the target I/O request to obtain a target I/O request having a modified destination address, and sends the target I/O request having the modified destination address to the second storage node.

Corresponding to step 302, after modifying the destination address in the target I/O request, the switch may further add the node address of the first storage node to the target I/O request, to be specific, retain the original destination address in the target I/O request, for example, may add the original destination address to fields CDW 2 to CDW 5 in the SQE packet. In addition, a Forwarded identifier may be further added to the target I/O request to indicate that the I/O request is sent by the switch to the storage node by modifying the destination address. For example, a CDW 0 field may be set to 1100 as the Forwarded identifier. After the target I/O request having the modified destination address is obtained, the target I/O request having the modified destination address may be sent to the second storage node, to indicate the second storage node to: perform the I/O request processing based on the target I/O request having the modified destination address; and after the second storage node completes the I/O request processing, send the first I/O request processing completion notification to the first storage node based on the node address of the first storage node.

It should be noted that modification on the fields in the target I/O request in step 301 and step 302 respectively may be understood as that before step 301 and step 302 are performed, the target I/O request may be copied first, to obtain a copied target I/O request; in step 301, processing on the target I/O request may be performed based on the original target I/O request; and in step 302, processing on the target I/O request may be performed based on the copied target I/O request.

Step 303: The first storage node receives the target I/O request on which the adding processing is performed and that is sent by the network forwarding device, where the processed identifier is added to the target I/O request on which the adding processing is performed.

Each time after receiving the I/O request sent by the network forwarding device, the first storage node may determine whether the received I/O request is the target I/O request on which the adding processing is performed. Step 301 is still used as an example. The first storage node may determine whether a value of the 4-bit reserved bit of CDW 0 in the received I/O request is a value corresponding to the processed identifier, that is, whether the value is 1111.

If it is determined that the received I/O request is not the target I/O request on which the adding processing is performed, the received I/O request may be normally processed. For example, in the present disclosure, if the network forwarding device determines that the first storage node and the second storage node are unified storage nodes, the value of the 4-bit reserved bit of CDW 0 may be set to 0000, to identify that a corresponding I/O request is processed by a storage node that receives the I/O request, and the CQE packet is submitted by the storage node. If it is determined that the received I/O request is the target I/O request on which the adding processing is performed, the received target I/O request on which the adding processing is performed may not be processed, for example, a processing process of the target I/O request on which the adding processing is performed may be suspended, waiting for the second storage node that processes the corresponding target I/O request to send the first I/O request processing completion notification.

Step 304: The second storage node receives the target I/O request that has the modified destination address and that is sent by the network forwarding device, where the target I/O request having the modified destination address carries the node address of the first storage node; performs the I/O request processing based on the target I/O request having the modified destination address; and after completing the I/O request processing, sends the first I/O request processing completion notification to the first storage node based on the node address of the first storage node.

Each time after receiving the I/O request sent by the network forwarding device, the second storage node may determine whether the received I/O request is the target I/O request having the modified destination address. Step 302 is still used as an example. The second storage node determines whether a value of the 4-bit reserved bit of CDW 0 in the received I/O request is a value corresponding to the Forwarded identifier, that is, whether the value is 1100.

If it is determined that the received I/O request is not the target I/O request having the modified destination address, the received I/O request may be normally processed. In this case, the value of the 4-bit reserved bit of CDW 0 may be 0000. If it is determined that the received I/O request is the target I/O request having the modified destination address, the received target I/O request to which the Forwarded identifier is added may be processed. After completing the I/O request processing, the second storage node sends the first I/O request processing completion notification to the first storage node based on the node address of the first storage node that is carried in the target I/O request. The first I/O request processing completion notification may be any notification indicating that the second storage node completes the corresponding I/O request processing.

Step 305: The first storage node receives the first I/O request processing completion notification sent by the second storage node.

Step 306: The first storage node sends the second I/O request processing completion notification to the network forwarding device.

After receiving the first I/O request processing completion notification sent by the second storage node, the first storage node may send the second I/O request processing completion notification to the network forwarding device, where the second I/O request processing completion notification may be the CQE packet.

It should be noted that, in the present disclosure, the first storage node and the second storage node are merely used to clearly describe the solution and distinguish between storage nodes. Actually, the first storage node and the second storage node may be any two storage nodes of a storage system, and any storage node of the storage system may implement operations performed by the first storage node and the second storage node.

Step 307: After receiving the second I/O request processing completion notification sent by the first storage node, the network forwarding device forwards the second I/O request processing completion notification to a client device that sends the target I/O request.

After receiving the second I/O request processing completion notification sent by the first storage node, the switch may send the second I/O request processing completion notification to the client device (the computing node) that sends the target I/O request. In this way, the client device perceives that the target I/O request is sent to the first storage node, and receives an I/O request processing completion notification returned by the first storage node. In other words, the I/O request processing method provided in this embodiment of the present disclosure needs to be applied only to the network forwarding device and the storage node, and the client device does not need to perform corresponding improvement. This can improve applicability of this embodiment of the present disclosure to various client devices and third-party multipathing software.

In this embodiment of the present disclosure, it is determined, by using the network forwarding device, whether the storage node to which the target I/O request is to be forwarded is the storage node for processing the target I/O request. If the storage node to which the target I/O request is to be forwarded is not the storage node that processes the target I/O request, the destination address in the target I/O request may be modified, and the target I/O request is sent to the storage node for actually processing the target I/O request, without a need of forwarding the target I/O request between storage nodes of the storage system. This can improve efficiency of processing the target I/O request.

FIG. 4 is a flowchart of an I/O request processing method according to an embodiment of the present disclosure, applied to a network forwarding device. The method is for processing when an I/O request is an immediate data write request. Refer to FIG. 4. The method includes the following steps.

Step 401: Determine whether a target I/O request is the immediate data write request.

The immediate data write request may be initiated by a computing node, and the immediate data write request also carries to-be-written data. Because the to-be-written data is generally greater than a maximum value of data that can be carried in a packet, the to-be-written data may be split into a plurality of different packets. The first packet in the plurality of packets may be referred to as the immediate data write request, and a non-first packet may be referred to as a write data packet subsequently.

Corresponding to the processing in step 401, when receiving any packet, a switch may determine whether the packet is a packet corresponding to the I/O request; and when determining whether the packet is the I/O request, the switch may further determine a type of the I/O request. For example, whether a received SQE packet is an I/O command and a type of the I/O command may be determined by using "metadata" of a command recorded by first four bytes in an SQE field. The type of the I/O command includes a write I/O request, a read I/O request, and the immediate data write request.

Step 402: If determining that the target I/O request is the immediate data write request, determine write request information corresponding to the immediate data write request.

The write request information includes a source address and a destination address of the immediate data write request, and a sequence number range of at least one write data packet corresponding to the immediate data write request.

If it is determined that the target I/O request is the immediate data write request, the write request information in the immediate data write request in the target I/O request may be obtained. The immediate data write request may carry a sequence number of the immediate data write request and a size of write data corresponding to an immediate write request. Because the first packet and the non-first packet corresponding to the immediate write request are sent continuously, a quantity of write data packets may be determined based on the size of the write data and a size of data carried in each packet, and then the sequence number range of each packet corresponding to the immediate data write request is determined based on the sequence number of the immediate data write request.

In addition, the source address and a target address in the immediate data write request may be obtained. An immediate data forwarding table may be established based on the source address and the destination address. In addition, in an RDMA protocol, a channel connection may be further established between the computing node and a storage node, and the immediate data write request may further carry a channel connection identifier. Therefore, the channel connection identifier in the immediate data write request may also be obtained and added to the immediate data forwarding table. Table 2 is a schematic example of the immediate data forwarding table, where source IP (ScrIP) is the source address, destination IP (DstIP) is the destination address, and Destination Queue Pair (DstQP) is the channel connection identifier.

TABLE 2

| Immediate data forwarding table | | | |
|---|---|---|---|
| | ScrIP | DstIP | DstQP |
| Immediate data request 0 | 1.111.111.10 | 1.111.111.11 | QP0-QP1 |
| Immediate data request 1 | 1.111.111.20 | 1.111.111.21 | QP0-QP2 |
| Immediate data request 2 | 1.111.111.30 | 1.111.111.31 | QP0-QP3 |
| . . . | . . . | . . . | . . . |

Step 403: When receiving a packet of a non-I/O request, determine, based on the write request information of the immediate data write request, whether the received packet belongs to the write data packet corresponding to the immediate data write request.

When the packet of the non-I/O request is received, the source address, the destination address, and the channel connection identifier in the packet may be obtained. Whether there are a corresponding source address, destination address, and channel connection identifier in the established immediate data forwarding table is determined. If there are the corresponding source address, destination address, and channel connection identifier, it indicates that the packet may be a non-first packet corresponding to an immediate data write request, and then, it may be determined whether the sequence number of the packet is within the corresponding sequence number range. If the sequence number is within the sequence number range, it may be determined that the received packet belongs to the write data packet corresponding to the immediate data write request.

Step 404: If determining that the received packet is the write data packet corresponding to the immediate data write request, modify a destination address in the write data packet to a node address of a second storage node, to obtain a write data packet having a modified destination address.

If it is determined that the received packet is the write data packet corresponding to the immediate data write request, the destination address in the write data packet is modified to the node address of the second storage node, to obtain the write data packet having the modified destination address.

Step 405: Send the write data packet having the modified destination address.

After the modified destination address is obtained, the write data packet having the modified destination address may be sent to the second storage node for processing. In addition, it should be noted that the switch may still send the write data packet existing before the destination address is modified to a first storage node. For example, when it is determined that the received packet is the write data packet corresponding to the immediate data write request, the write data packet may be first copied, to obtain a copied write data packet. Steps 404 and 405 may be performed on the copied write data packet, and the original write data packet may be sent to the first storage node.

Before the original write data packet is sent to the first storage node, the write data carried in the write data packet may be deleted, and only header information corresponding to the write data packet is retained. This can reduce bandwidth occupied by sending the write data packet to the first storage node, and improve efficiency of sending the write data packet to the first storage node. Processing performed after the first storage node receives the write data packet is not described herein. For details, refer to a method procedure corresponding to FIG. 5.

In this embodiment of the present disclosure, it is determined, by using the network forwarding device, whether the storage node to which the target I/O request sent by the computing node is to be forwarded is the storage node for processing the target I/O request. If the storage node to which the target I/O request sent by the computing node is to be forwarded is not the storage node that processes the target I/O request, the destination address in the target I/O request may be modified, and the target I/O request is sent to the storage node for actually processing the target I/O request, without a need of forwarding the target I/O request between storage nodes of the storage system. This can improve efficiency of processing the target I/O request.

FIG. 5 is a flowchart of an I/O request processing method according to an embodiment of the present disclosure, applied to a first storage node. The method is for processing when an I/O request is an immediate data write request. Refer to FIG. 5. The method includes the following steps.

Step 501: Determine whether a target I/O request on which adding processing is performed is the immediate data write request.

When receiving any packet, the first storage node may determine whether the packet is a packet corresponding to the I/O request. In addition, when it is determined whether the packet is the I/O request, a type of the I/O request may be further determined. For example, whether a received SQE packet is an I/O command and a type of the I/O command may be determined by using "metadata" of a command recorded by first four bytes in an SQE field.

Step 502: If determining that the target I/O request on which the adding processing is performed is the immediate data write request, determine write request information corresponding to the immediate data write request, where the write request information includes a source address and a destination address of the immediate data write request, and a packet identifier range corresponding to a plurality of write data packets corresponding to the immediate data write request.

The write request information includes the source address and the destination address of the immediate data write request, and the packet identifier range of at least one write data packet corresponding to the immediate data write request. If it is determined that the target I/O request is the immediate data write request, the write request information in the immediate data write request in the target I/O request may be obtained. The immediate data write request may carry a sequence number of the immediate data write request and a size of write data corresponding to an immediate write request. Because the first packet and a non-first packet corresponding to the immediate write request are sent continuously, a sequence number range of each packet corresponding to the immediate data write request may be determined, and the source address and a target address in the immediate data write request may be obtained. An immediate data forwarding table may be established based on the source address and the destination address. In addition, in an RDMA protocol, a channel connection may be further established between a computing node and a storage node, and the immediate data write request may further carry a channel connection identifier. Therefore, the channel connection identifier in the immediate data write request may also be obtained and added to the immediate data forwarding table. For the immediate data forwarding table, refer to Table 2.

Step 503: When receiving a packet of a non-I/O request, determine, based on the write request information of the immediate data write request, whether the received packet belongs to the write data packet corresponding to the immediate data write request.

When the packet of the non-I/O request is received, the source address, the destination address, and the channel connection identifier in the packet may be obtained. Whether there are a corresponding source address, destination address, and channel connection identifier in the established immediate data forwarding table is determined. If there are the corresponding source address, destination address, and channel connection identifier, it indicates that the packet may be a non-first packet corresponding to an immediate data write request, and then, it may be determined whether the sequence number of the packet is within the corresponding sequence number range. If the sequence number is within the sequence number range, it may be determined that the received packet belongs to the write data packet corresponding to the immediate data write request.

Step 504: If determining that the received packet is the write data packet corresponding to the immediate data write request, skip processing the write data packet.

If it is determined that the received packet is the write data packet corresponding to the immediate data write request, the write data packet is not processed. When a first I/O request processing completion notification sent by the second storage node after the second storage node completes processing on the immediate data write request is received, a second I/O request processing completion notification may be sent to a network forwarding device, and then the second I/O request processing completion notification is forwarded to a client device by using the network forwarding device.

In this embodiment of the present disclosure, it is determined, by using the network forwarding device, whether the storage node to which the target I/O request sent by the computing node is to be forwarded is the storage node for processing the target I/O request. If the storage node to which the target I/O request sent by the computing node is to be forwarded is not the storage node that processes the target I/O request, the destination address in the target I/O request may be modified, and the target I/O request is sent to the storage node for actually processing the target I/O request, without a need of forwarding the target I/O request between storage nodes of a storage system. This can improve efficiency of processing the target I/O request.

Based on a same technical concept, an embodiment of the present disclosure further provides an I/O request processing apparatus. The apparatus may be the network forwarding device in the foregoing embodiment. As shown in FIG. 6, the apparatus includes: a receiving module 610 configured to: receive a target I/O request, where the target I/O request carries a destination address and a target logical block address, the destination address is a node address of a first storage node, and specifically, the receiving function in step 201 and other hidden steps may be implemented; a determining module 620 configured to: determine, based on a preset correspondence between a logical block address and a storage node, a second storage node corresponding to the target logical block address, where specifically, the determining function in step 202 and other hidden steps may be implemented; a modification module 630 configured to: if the second storage node is inconsistent with the first storage node, modify the destination address in the target I/O request to a node address of the second storage node, to obtain a target I/O request having a modified destination address, where specifically, the modification function in step 203 and other hidden steps may be implemented; and a sending module 640 configured to: send the target I/O request having the modified destination address, where specifically, the sending function in step 204 and other hidden steps may be implemented.

In a possible implementation, the modification module 630 is configured to: modify the destination address in the target I/O request to a storage node address corresponding to the second storage node, and add the node address of the first storage node to the target I/O request, to obtain the target I/O request having the modified destination address, where the target I/O request having the modified destination address indicates the second storage node to perform, based on the target I/O request having the modified destination address, I/O request processing after the second storage node receives the target I/O request having the modified destination address; and after the second storage node completes the I/O request processing, send a first I/O request processing completion notification to the first storage node based on the node address of the first storage node.

In a possible implementation, the sending module 640 is further configured to: add a processed identifier to the target I/O request, to obtain a target I/O request on which adding processing is performed; send the target I/O request on which the adding processing is performed to the first storage node, where the processed identifier indicates the first storage node to: skip performing the I/O request processing on the target I/O request on which the adding processing is performed; and send a second I/O request processing completion notification to the network forwarding device after the first storage node receives the first I/O request processing completion notification sent by the second storage node.

The receiving module 610 is further configured to receive the second I/O request processing completion notification sent by the first storage node.

The sending module 640 is further configured to forward the second I/O request processing completion notification to a client device that delivers the target I/O request.

In a possible implementation, the determining module 620 is further configured to: determine whether the target I/O request is an immediate data write request; if determining that the target I/O request is the immediate data write request, determine write request information corresponding to the immediate data write request, where the write request information includes a source address and a destination address of the immediate data write request, and a sequence number range of at least one write data packet corresponding to the immediate data write request; when a packet of a non-I/O request is received, obtain a source address, a destination address, and a sequence number of the packet of the non-I/O request, and determine, based on the write request information of the immediate data write request, whether the received packet belongs to the write data packet corresponding to the immediate data write request; and if determining that the received packet is the write data packet corresponding to the immediate data write request, modify a destination address in the write data packet to the node address of the second storage node, to obtain a write data packet having a modified destination address.

The sending module is further configured to send the write data packet having the modified destination address.

Figures 7, 8:
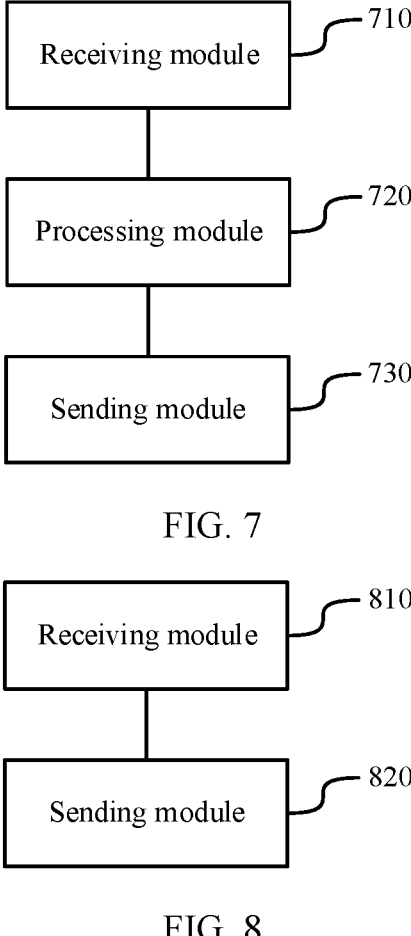
FIG. 7 is a schematic diagram of a structure of an I/O request processing apparatus according to an embodiment of the present disclosure.
FIG. 8 is a schematic diagram of a structure of an I/O request processing apparatus according to an embodiment of the present disclosure.

Based on a same technical concept, an embodiment of the present disclosure further provides an I/O request processing apparatus. The apparatus may be the second storage node in the foregoing embodiment. As shown in FIG. 7, the apparatus includes: a receiving module 710 configured to: receive a target I/O request that has a modified destination address and that is sent by a network forwarding device, where the target I/O request having the modified destination address carries a node address of a first storage node, and specifically, the receiving function in step 304 and other hidden steps may be implemented; a processing module 720 configured to: perform I/O request processing based on the target I/O request having the modified destination address, and specifically, the processing function in step 304 and other hidden steps may be implemented; a sending module 730 configured to: after the I/O request processing is completed, send a first I/O request processing completion notification to the first storage node based on the node address of the first storage node, where the first I/O request processing completion notification indicates the first storage node to send a second I/O request processing completion notification to the network forwarding device after the first storage node receives the first I/O request processing completion notification, to enable the network forwarding device to send the second I/O request processing completion notification to a client device that delivers the target I/O request, and specifically the sending function in step 304 and other hidden steps may be implemented.

Based on a same technical concept, an embodiment of the present disclosure further provides an I/O request processing apparatus. The apparatus may be the first storage node in the foregoing embodiment. As shown in FIG. 8, the apparatus includes: a receiving module 810 configured to: receive a target I/O request on which adding processing is performed and that is sent by a network forwarding device, where a processed identifier is added to the target I/O request on which the adding processing is performed; receive a first I/O request processing completion notification sent by a second storage node, where specifically, the receiving function in step 305 and other hidden steps may be implemented; and a sending module 820 configured to send a second I/O request processing completion notification to the network forwarding device, to enable the network forwarding device to send the second I/O request processing completion notification to a client device that delivers the target I/O request, and specifically, the sending function in step 306 and other hidden steps may be implemented.

In a possible implementation, the apparatus further includes a determining module 830 configured to: determine whether the target I/O request on which the adding processing is performed is an immediate data write request; if determining that the target I/O request on which the adding processing is performed is the immediate data write request, determine write request information corresponding to the immediate data write request, where the write request information includes a source address and a destination address of the immediate data write request, and a packet identifier range corresponding to a plurality of write data packets corresponding to the immediate data write request; when a packet of a non-I/O request is received, obtain a source address, a destination address, and a sequence number of the packet of the non-I/O request, and determine, based on the write request information of the immediate data write request, whether the received packet belongs to the write data packet corresponding to the immediate data write request; and if determining that the received packet is the write data packet corresponding to the immediate data write request, skip processing the write data packet.

It should be noted that, when the I/O request processing apparatus provided in the foregoing embodiment processes the I/O request, division of the foregoing functional modules is merely used as an example for description. In actual application, the foregoing functions may be allocated to different functional modules for implementation based on a requirement. To be specific, an internal structure of a source server is divided into different functional modules to implement all or part of the functions described above. In addition, the I/O request processing apparatus provided in the foregoing embodiment and the I/O request processing method embodiment belong to a same concept. For a specific implementation, refer to the method embodiment.

Based on a same technical concept, an embodiment of the present disclosure further provides an I/O request processing system. The system includes a network forwarding device, a first storage node, and a second storage node.

The network forwarding device is configured to: receive a target I/O request, where the target I/O request carries a destination address and a target logical block address, and the destination address is a node address of the first storage node; determine, based on a preset correspondence between a logical block address and a storage node, the second storage node corresponding to the target logical block address; if the second storage node is inconsistent with the first storage node, modify the destination address in the target I/O request to a node address of the second storage node, to obtain a target I/O request having a modified destination address; and send the target I/O request having the modified destination address.

The second storage node is configured to: receive the target I/O request that has the modified destination address and that is sent by the network forwarding device, where the target I/O request having the modified destination address carries the node address of the first storage node; perform I/O request processing based on the target I/O request having the modified destination address; and after completing the I/O request processing, send a first I/O request processing completion notification to the first storage node based on the node address of the first storage node.

The first storage node is configured to: receive a target I/O request on which adding processing is performed and that is sent by the network forwarding device, where a processed identifier is added to the target I/O request on which the adding processing is performed; receive the first I/O request processing completion notification sent by the second storage node; and send a second I/O request processing completion notification to the network forwarding device.

It should be noted that the storage system provided in the foregoing embodiment and a data down-flush method embodiment belong to a same concept. For a specific implementation, refer to the method embodiment.

Embodiments of the present disclosure further provide a network forwarding device. The network forwarding device includes a memory and a processor. The memory is configured to store computer instructions, and the processor executes the computer instructions stored in the memory, to enable the network forwarding device to perform the method for processing the I/O request in the foregoing embodiment.

Embodiments of the present disclosure further provide a storage node. As shown in FIG. 1, the storage node includes a controller and a processor. A memory is configured to store computer instructions, and the processor executes the computer instructions stored in the memory, to enable the storage node to perform the method for processing the I/O request in the foregoing embodiment.

In the foregoing embodiment, all or part of the software, hardware, firmware, or any combination thereof may be implemented. When the software is used for implementation, all or part of the implementation may be implemented in a form of a computer program product. The computer program product includes one or more computer instructions. When the computer program instructions are loaded and executed on a device, all or some of procedures or functions according to embodiments of the present disclosure are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium that can be accessed by the device, or a data storage device such as a server or a data center that integrates one or more usable media. The usable medium may be a magnetic medium (for example, a floppy disk, a hard disk, or a magnetic tape), an optical medium (for example, a digital video disk (DVD)), a semiconductor medium (for example, an SSD).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method comprising:
receiving a first target input/output (I/O) request, wherein the first target I/O request carries a first destination address and a target logical block address, and wherein the first destination address is a first node address of a first storage node;
determining, based on a preset correspondence between a logical block address and a storage node, a second storage node corresponding to the target logical block address;
modifying, when if the second storage node is not the first storage node, the first destination address in the first target I/O request to a second node address of the second storage node, to obtain a second target I/O request; and
sending the second target I/O request to the second storage node.

2. The method according to claim 1, wherein modifying the first destination address in the first target I/O request to obtain the second target I/O request comprises adding the first node address to the first target I/O request, wherein the second target I/O request indicates to the second storage node to perform, based on the second target I/O request, I/O request processing and send, based on the first node address, a first I/O request processing completion notification to the first storage node.

3. The method according to claim 2, further comprising:
adding a processed identifier to the first target I/O request to obtain a third target I/O request;
sending the third target I/O request to the first storage node, wherein the processed identifier indicates to the first storage node to skip performing the I/O request processing on the third target I/O request and send a second I/O request processing completion notification based on the first I/O request processing completion notification;
receiving the second I/O request processing completion notification from the first storage node; and
forwarding the second I/O request processing completion notification to a client device associated with the first target I/O request.

4. The method according to claim 3, further comprising:
determining whether the first target I/O request is an immediate data write request;
determining, when the first target I/O request is the immediate data write request, write request information corresponding to the immediate data write request, wherein the write request information comprises a first source address of the immediate data write request, a second destination address of the immediate data write request, and a first sequence number range of at least one write data packet corresponding to the immediate data write request;

obtaining, when receiving a non-I/O request packet, a second source address, a third destination address, and a second sequence number of the non-I/O request packet;

determining, based on the write request information, whether the non-I/O request packet is a write data packet corresponding to the immediate data write request;

modifying, when the non-I/O request packet is the write data packet, a fourth destination address of the write data packet to the second node address to obtain a modified write data packet; and sending the modified write data packet to the second storage node.

5. The method according to claim 4, wherein the immediate data write request carries a channel connection identifier for establishing a channel connection using a remote direct memory access (RDMA) protocol between the client device and the second storage node.

6. The method according to claim 4, wherein modifying, when the non-I/O request packet is the write data packet, the fourth destination address of the write data packet to obtain the modified write data packet comprises:

copying the write data packet to obtain a copy of the write data packet; and modifying the fourth destination address in the copy of the write data packet to the second node address to obtain the modified write data packet.

7. The method according to claim 4, further comprising:

removing, when the non-I/O request packet is the write data packet, write data carried in the write data packet to obtain a reduced write data packet comprising only header information corresponding to the write data packet; and sending the reduced write data packet to the first storage node.

8. The method according to claim 1, further comprising:

receiving a submission queue entry (SQE) packet comprising an SQE field; and determining that the SQE packet comprises the first target I/O request based on metadata of a command carried by a first four bytes in the SQE field.

9. The method according to claim 1, further comprising sending, when the second storage node is the first storage node, the first target I/O request to the first storage node.

10. The method according to claim 1, further comprising adding a forwarded identifier to the second target I/O request to indicate that the second target I/O request is an I/O request with a destination address that was modified from the first node address to the second node address.

11. A system comprising:

a first storage node;

a second storage node; and a network forwarding device configured to:

receive a first target I/O request, wherein the first target I/O request carries a first destination address and a target logical block address, and wherein the first destination address is a first node address of the first storage node;

determine, based on a preset correspondence between a logical block address and a storage node, the second storage node corresponding to the target logical block address;

modify, when the second storage node is not the first storage node, the first destination address in the first target I/O request to a second node address of the second storage node, to obtain a second target I/O request;

send the second target I/O request to the second storage node; and send a third target I/O request to the first storage node, wherein the second storage node is configured to:

receive the second target I/O request from the network forwarding device;

perform I/O request processing based on the second target I/O request; and send, after completing the I/O request processing and using the first node address, a first I/O request processing completion notification to the first storage node, and wherein the first storage node is configured to:

receive the third target I/O request;

add a processed identifier to the third target I/O request;

receive the first I/O request processing completion notification from the second storage node; and send a second I/O request processing completion notification to the network forwarding device in response to receiving the first I/O request processing completion notification.

12. The system according to claim 11, wherein the first storage node is further configured to:

determine whether the third target I/O request is an immediate data write request;

determine, when the third target I/O request is the immediate data write request, write request information corresponding to the immediate data write request, wherein the write request information comprises a first source address of the immediate data write request, a second destination address of the immediate data write request, and a packet identifier range corresponding to a plurality of write data packets corresponding to the immediate data write request;

receive a non-I/O request packet;

obtain, based on the non-I/O request packet, a second source address, a third destination address, and a sequence number of the non-I/O request packet;

determine, based on the write request information, whether the non-I/O request packet is a write data packet of the plurality of write data packets; and skip, when the non-I/O request packet is the write data packet, processing of the write data packet.

13. A network forwarding device comprising:

a memory configured to store computer instructions; and a processor configured to execute the computer instructions to cause the network forwarding device to:

receive a first target input/output (I/O) request, wherein the first target I/O request carries a first destination address and a target logical block address, and wherein the first destination address is a first node address of a first storage node;

determine, based on a preset correspondence between a logical block address and a storage node, a second storage node corresponding to the target logical block address;

modify, when the second storage node is not the first storage node, the first destination address in the first target I/O request to a second node address of the second storage node, to obtain a second target I/O request; and send the second target I/O request to the second storage node.

14. The network forwarding device according to claim 13, wherein the computer instructions to modify the first destination address in the first target I/O request to the second node address to obtain the second target I/O request comprises instructions to:

add the first node address to the first target I/O request, wherein the second target I/O request indicates to the second storage node to perform, based on the second target I/O request, I/O request processing and send, using the first node address, a first I/O request processing completion notification to the first storage node.

15. The network forwarding device according to claim 14, wherein the processor further executes the computer instructions to cause the network forwarding device to:

add a processed identifier to the first target I/O request, to obtain a third target I/O request;

send the third target I/O request to the first storage node, wherein the processed identifier indicates to the first storage node to skip performing the I/O request processing on the third target I/O request and send a second I/O request processing completion notification based on the first I/O request processing completion notification;

receive the second I/O request processing completion notification from the first storage node; and forward the second I/O request processing completion notification to a client device associated with the first target I/O request.

16. The network forwarding device according to claim 15, wherein the processor further executes the computer instructions to cause the network forwarding device to:

determine whether the first target I/O request is an immediate data write request;

determine, when the first target I/O request is the immediate data write request, write request information corresponding to the immediate data write request, wherein the write request information comprises a first source address of the immediate data write request, a second destination address of the immediate data write request, and a first sequence number range of at least one write data packet corresponding to the immediate data write request;

obtain, when receiving a non-I/O request packet, a second source address, a third destination address, and a second sequence number of the non-I/O request packet;

determine, based on the write request information, whether the non-I/O request packet is a write data packet corresponding to the immediate data write request;

modify, when the non-I/O request packet is the write data packet, a fourth destination address of the write data packet to the second node address to obtain a modified write data packet; and send the modified write data packet to the second storage node.

17. The network forwarding device according to claim 16, wherein the immediate data write request carries a channel connection identifier for establishing a channel connection using a remote direct memory access (RDMA) protocol between the client device and the second storage node.

18. The network forwarding device according to claim 13, wherein the processor is further configured to execute the computer instructions to cause the network forwarding device to:

receive a submission queue entry (SQE) packet comprising an SQE field; and determine that the SQE packet comprises the first target I/O request based on metadata of a command carried by a first four bytes in the SQE field.

19. The network forwarding device according to claim 13, wherein the processor is further configured to execute the computer instructions to cause the network forwarding device to send, when the second storage node is the first storage node, the first target I/O request to the first storage node.

20. The network forwarding device according to claim 13, wherein the processor is further configured to executes the computer instructions to cause the network forwarding device to add a forwarded identifier to the second target I/O request to indicate that the second target I/O request is an I/O request with a destination address that was modified from the first node address to the second node address.

\* \* \* \* \*